US012687950B2

(12) United States Patent
Hsu et al.

(10) Patent No.: US 12,687,950 B2
(45) Date of Patent: Jul. 21, 2026

(54) TOUCH DEVICE AND SMART APPARATUS

(71) Applicant: JADARD TECHNOLOGY INC.,
Shenzhen (CN)

(72) Inventors: Yu-Chieh Hsu, Tainan (TW); Hsiu-Na Hsieh, Shenzhen (CN); Chih-Wei Chien, Shenzhen (CN); Feng-Liang Huang, Shenzhen (CN)

(73) Assignee: JADARD TECHNOLOGY INC.,
Shenzhen (CN)

( * ) Notice: Subject to any disclaimer, the term of this patent is extended or adjusted under 35 U.S.C. 154(b) by 0 days.

(21) Appl. No.: 18/952,978

(22) Filed: Nov. 19, 2024

(65) Prior Publication Data

US 2026/0037087 A1      Feb. 5, 2026

(30) Foreign Application Priority Data

Aug. 5, 2024    (CN) .......................... 202411067780.1

(51) Int. Cl.
*G06F 3/041*          (2006.01)
*G06F 3/044*          (2006.01)
(52) U.S. Cl.
CPC ........ *G06F 3/04166* (2019.05); *G06F 3/0443* (2019.05)
(58) Field of Classification Search
None
See application file for complete search history.

(56) References Cited

U.S. PATENT DOCUMENTS

| | | | | |
|---|---|---|---|---|
| 2014/0043284 A1* | 2/2014 | Park | ....................... | G06F 3/0445 |
| | | | | 345/174 |
| 2015/0317023 A1* | 11/2015 | Wei | ....................... | G06F 3/0446 |
| | | | | 345/174 |
| 2016/0062501 A1* | 3/2016 | Hsu | ....................... | G06F 3/04883 |
| | | | | 345/174 |

FOREIGN PATENT DOCUMENTS

TW            202044003 A      12/2020

* cited by examiner

*Primary Examiner* — Krishna P Neupane
(74) *Attorney, Agent, or Firm* — ScienBiziP, P.C.

(57)          ABSTRACT

A touch device includes a substrate, a plurality of touch electrodes on a surface of the substrate, a plurality of first switches and a plurality of second switches, a switch control circuit, and a touch control circuit. Each of the first switches is connected to at least one of the touch electrodes. The switch control circuit is connected to the first switches and the second switches. The switch control circuit is used to output a first signal to each of the first switches, output a second signal to each of the second switches, and control working states of the first switches and the second switches according to the first signal and the second signal to control connection relationships of the touch electrodes. The touch control circuit is used to recognize touch operations on at least parts of the touch electrodes. A smart apparatus is also provided.

15 Claims, 8 Drawing Sheets

TOUCH DEVICE AND SMART APPARATUS

FIELD

The subject matter herein generally relates to touch technology, and particularly relates to a touch device and a smart apparatus including the touch device.

BACKGROUND

There are many non-contact touch scenes available in the market, such as ordering systems, "phone to ear" off screen function, non-contact door control systems, automobile gesture control systems, point of sales (POS) machines, etc. A conventional non-contact touch systems is usually difficult to generate sensing signals due to insufficient sensing distance. Optical sensors are added to the touch system to enhance its sensitivity. However, adding the optical sensors results in additional components and increased costs.

BRIEF DESCRIPTION OF THE DRAWINGS

Implementations of the present disclosure will now be described, by way of embodiment, with reference to the attached figures, wherein.

DETAILED DESCRIPTION

Figure 1:
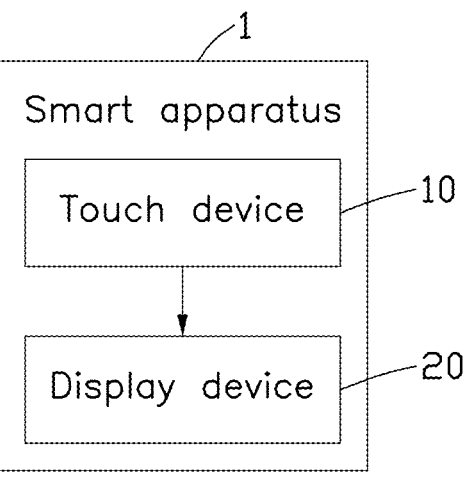
FIG. 1 is a schematic diagram of a first embodiment of a module structure of a smart apparatus according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached, or coupled to the other feature or element or an intervening features or elements may be present.

The present embodiment provides a touch device and a smart apparatus including the touch device. The touch device can change electrical connection relationships of touch electrodes by including switches connecting the touch electrodes, thereby changing a sensing distance of the touch device and making it suitable for various sensing scenarios.

Embodiment 1

Referring to FIG. 1, a smart apparatus 1 in this embodiment includes a touch device 10 and a display module 20 electrically connected to each other. The touch device 10 is used to recognize a user's touch operations, and the display module 20 is used to display images based on the touch operations.

The smart apparatus 1 integrates display and touch functions, and the smart apparatus 1 may be a smartphone, a tablet, a laptop, a car multimedia device, or a smart household electrical appliance, etc. The touch device 10 can be an out-cell touch device or an in-cell touch device. The touch device 10 can be used for sensing contact-touch operations. The contact-touch operations refer to touch objects contacting the touch device 10 directly, wherein the touch objects include fingers, touch pens, etc. The touch device 10 can also be used for sensing non-contact touch operations (also known as floating touch). The non-contact touch operations refer to touch objects do not directly contact the touch device 10. The display module 20 can be, for example, a liquid crystal display (LCD), a micro light emitting diode (Micro LED) display, an organic light emitting diode (OLED) display, etc.

In this embodiment, taking the touch device 10 as an out-cell touch device as an example, the structure and function of the touch device 10 are illustrated in the following.

Figure 2:
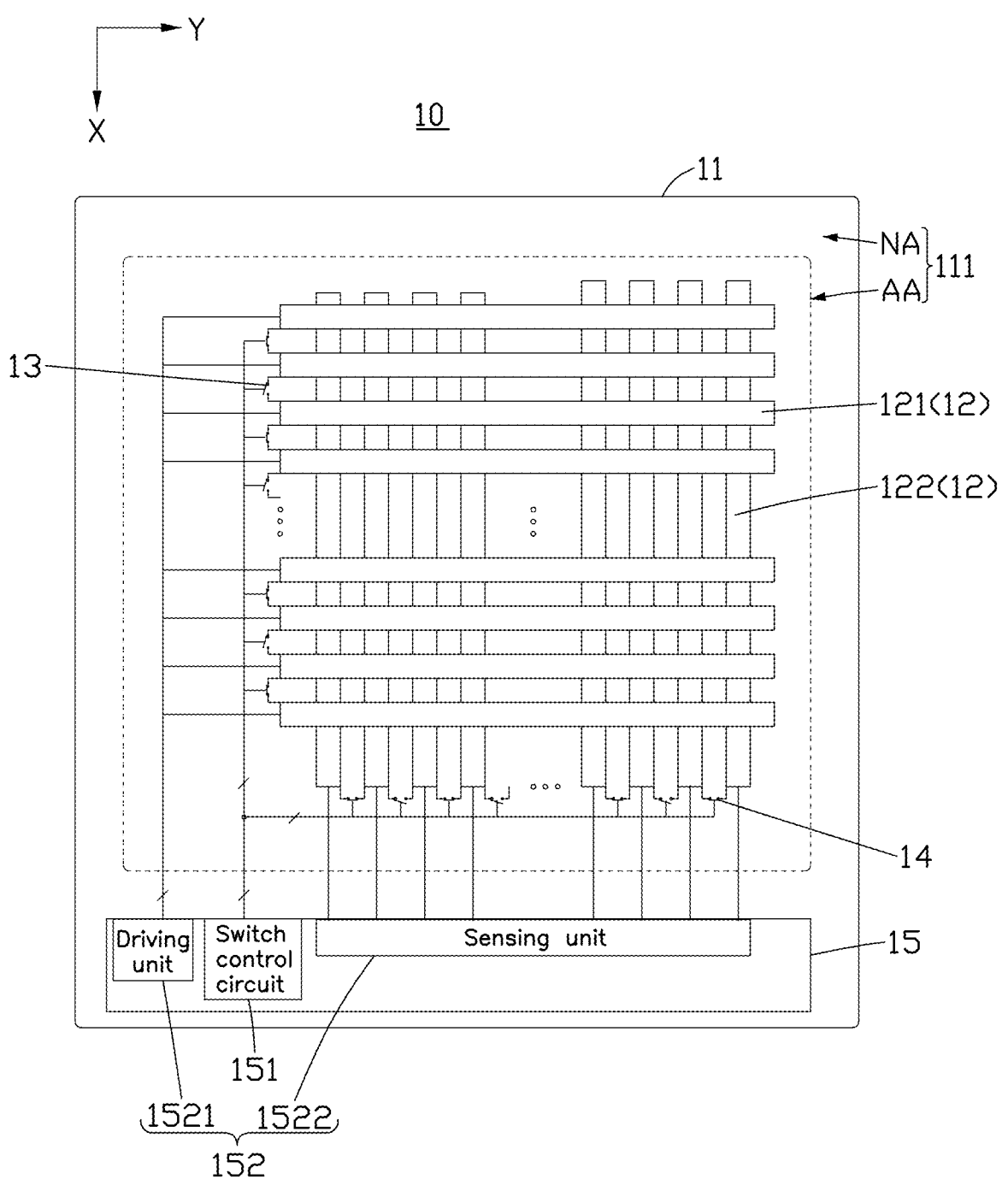
FIG. 2 is a s planar view of an embodiment of a touch device in the first embodiment of the module structure according to the present disclosure.

Referring to FIG. 2, the touch device 10 of this embodiment includes a substrate 11, a plurality of touch electrodes 12, a plurality of first switches 13, a plurality of second switches 14, and a touch integrated circuit (IC) 15. The touch IC 15 includes a switch control circuit 151 and a touch control circuit 152. The switch control circuit 151 is electrically connected to the first switches 13 and the second switches 14. The touch control circuit 152 is electrically connected the touch electrodes 12. The touch electrodes 12, the first switches 13, the second switches 14, and the touch IC 15 are on a same surface 111 of the substrate 11.

The surface 111 of substrate 11 includes a display area AA and a non-display area NA connecting and surrounding the display area AA. The display area AA is rectangular, and the surface 111 is also rectangular. The touch electrodes 12 are in the display area AA of the surface 111. The first switches 13, the second switches 14, and the touch IC 15 are in the non-display area NA of the surface 111.

In this embodiment, the substrate 11 is made of transparent insulating material (such as glass), and each touch electrode 12 is made of transparent conductive material (such as indium tin oxide). The display area AA can transmit light and is for the smart apparatus 1 to display images, while the non-display area NA corresponds to a border area of the smart apparatus 1. The non-display area NA is usually used for wires layout. In other embodiments of the present application, the surface 111 and the display area AA may not be rectangular, for example, they may be circular or other irregular shapes. In other embodiments of the present application, layout of the display area AA and the non-display area NA may be different, for example, the display area AA and the non-display area NA may arranged side by side and spliced to form the surface 111 of the substrate 11.

In this embodiment, the touch electrodes 12 on the substrate 11 are divided into two groups, and each group of touch electrodes 12 includes multiple touch electrodes 12. One group of touch electrodes 12 serves as driving electrodes 121, the other group of touch electrodes 12 serves as sensing electrodes 122. That is, a plurality of driving electrodes 121 and a plurality of sensing electrodes 122 are provided on the substrate 11.

All driving electrodes 121 are on a same layer, all sensing electrode 122 are on a same layer. The driving electrodes 121 are stacked on top of the sensing electrodes 122 and are spaced apart from the sensing electrodes 122. For example, a transparent insulating layer is formed between the driving electrodes 121 and the sensing electrodes 122, not shown in the figure. In other embodiments, the or the sensing electrodes 122 may be stacked on top of the driving electrode 121. Each driving electrode 121 is a strip electrode. The driving electrodes 121 are parallel to each and are spaced apart from each other. The driving electrodes 121 are arranged along a first direction X, and each driving electrode 121 extends along a second direction Y Each sensing electrode 122 is a strip electrode. The sensing electrodes 122 are parallel to each and are spaced apart from each other. The sensing electrodes 122 are arranged in the second direction Y, and each sensing electrode 122 extends along the first direction X. The first direction X is perpendicular to the second direction Y, the first direction X is parallel to one side of the surface 111, and the second direction Y is parallel to another side of the surface 111.

In this embodiment, each first switch 13 is electrically connected to two adjacent driving electrodes 121. Different first switches 13 are connected to different driving electrodes 121. That is, one first switch 13 is connected between each two adjacent driving electrodes 121. For example, along the first direction X, one first switch 13 is connected between a first driving electrode 121 and a second driving electrode 121, one first switch 13 is connected between the second driving electrode 121 and a third driving electrode 121, and one first switch 13 is connected between a (n–1)th driving electrode 121 and a nth driving electrode 121.

Each second switch 14 is electrically connected to two adjacent sensing electrodes 122. Different second switches 14 are connected to different sensing electrodes 122. That is, one second switch 14 is connected between each two adjacent sensing electrodes 122. For example, along the second direction Y, one second switch 14 is connected between a first sensing electrode 122 and a second sensing electrode 122, one second switch 14 is connected between the second sensing electrode 122 and a third sensing electrode 122, and one second switch 14 is connected between a (m–1)th sensing electrode 122 and a mth sensing electrode 122.

The switch control circuit 151 is used to output a first signal to each first switch 13. The first signal is used to control a working state of the first switch 13. An electrical connection relationship between the two driving electrodes 121 connected to the first switch 13 changes with the working state of the first switch 13. Therefore, the switch control circuit 151 controls the working state of the first switch 13 through the first signal to control the electrical connection relationship between adjacent two driving electrodes 121.

The switch control circuit 151 is used to output a second signal to each second switch 14. The second signal is used to control a working state of the second switch 14. An electrical connection relationship between the two sensing electrodes 122 connected to the second switch 14 changes with the working state of the second switch 14. Therefore, the switch control circuit 151 controls the working state of the second switch 14 through the second signal to control the electrical connection relationship between adjacent two sensing electrodes 122.

Each first switch 13 and each second switch 14 is a transistor, such as a triode or a Metal Oxide Semiconductor Field Effect Transistor (MOS). The first signal and the second signal are voltage signals. The switch control circuit 151 is used to control the first switch 13 switched on or switched off (that is, the working state) through the first signal, thereby controlling the electrical connection relationship between the adjacent two driving electrodes 121. The switch control circuit 151 is further used to control the second switch 14 switched on or switched off through the second signal, thereby controlling the electrical connection relationship between the adjacent two sensing electrodes 122. In this embodiment, each first switch 13 is a MOS transistor, and each second switch 14 is a MOS transistor.

A gate electrode of each first switch 13 is electrically connected to the switch control circuit 151, and a source electrode and a drain electrode of each first switch 13 are electrically connected to two adjacent driving electrodes 121, respectively. Each first switch 13 corresponds to a first gate voltage. When an amplitude of the first signal (that is, a voltage of the first signal) is greater than or equal to the first gate voltage, the first switch 13 is in the "on" state (switched on), wherein the source and the drain of the first switch 13 are conductive, and the two adjacent driving electrodes 121 connected to the first switch 13 are electrically connected. When the amplitude of the first signal is less than the first gate voltage, the first switch 13 is in the "off" state (switched off), wherein the source electrode and the drain electrode of the first switch 13 are non-conductive, and the two adjacent driving electrodes 121 connected to the first switch 13 are insulated.

A gate electrode of each second switch 14 is electrically connected to the switch control circuit 151, and a source electrode and a drain electrode of each second switch 14 are electrically connected to two adjacent sensing electrodes 122, respectively. Each second switch 14 corresponds to a second gate voltage. When an amplitude (that is, a voltage) of the second signal is greater than or equal to the second gate voltage, the second switch 14 is in the "on" state (switched on), wherein the source electrode and the drain electrode of the second switch 14 are conductive, and the two adjacent sensing electrodes 122 connected to the second switch 14 are electrically connected. When the amplitude of the second signal is less than the second gate voltage, the second switch 14 is in the "off" state (switched off), wherein the source electrode and the drain electrode of the second switch 14 are non-conductive, and the two adjacent sensing electrodes 122 connected to the second switch 14 are insulated.

In this embodiment, the first switches 13 have a same first gate voltage, the second switches 14 have a same second gate voltage, and the first gate voltage is the same as the second gate voltage.

The switch control circuit 151 is used to control the working states of the first switches 13 and the second switches 14 by controlling the amplitude of the first signal output to the first switches 13 and the amplitude of the second signal output to the second switches 14, thereby controlling the electrical connection relationship between the touch electrodes 12 on the substrate 11.

The touch control circuit 152 includes a driving unit 1521 and a sensing unit 1522. The driving unit 1521 is electrically connected to the driving electrodes 121 and is used to output a driving signal to each driving electrode 121. The sensing unit 1522 is electrically connected to the sensing electrodes 122 and is used to receive sensing signals on the sensing electrodes 122 and recognize the user's touch operations based on the sensing signals. In this embodiment, the driving unit 1521 and the sensing unit 1522 are circuits for achieving corresponding functions mentioned above and are parts of the touch IC 15.

In this embodiment, the touch device 10 is a capacitive touch device, and the sensing signals are capacitive signals. That is, the driving unit 1521 is used to output the driving signal to each driving electrode 121, wherein a capacitance change occurs on at least one sensing electrode 122 at a touch position if there is a touch operation. The capacitance change is received by the sensing unit 1522 as the sensing signal for recognizing the touch operation.

In this embodiment, the touch device 10 is mainly applied to non-contact touch operation scenarios to recognize gestures and actions (such as circling and sliding) performed in the air. The touch device 10 has a sensing distance. The touch device 10 can recognize touch operations within the sensing distance, but it is difficult to recognize touch operations beyond the sensing distance.

Figure 4:
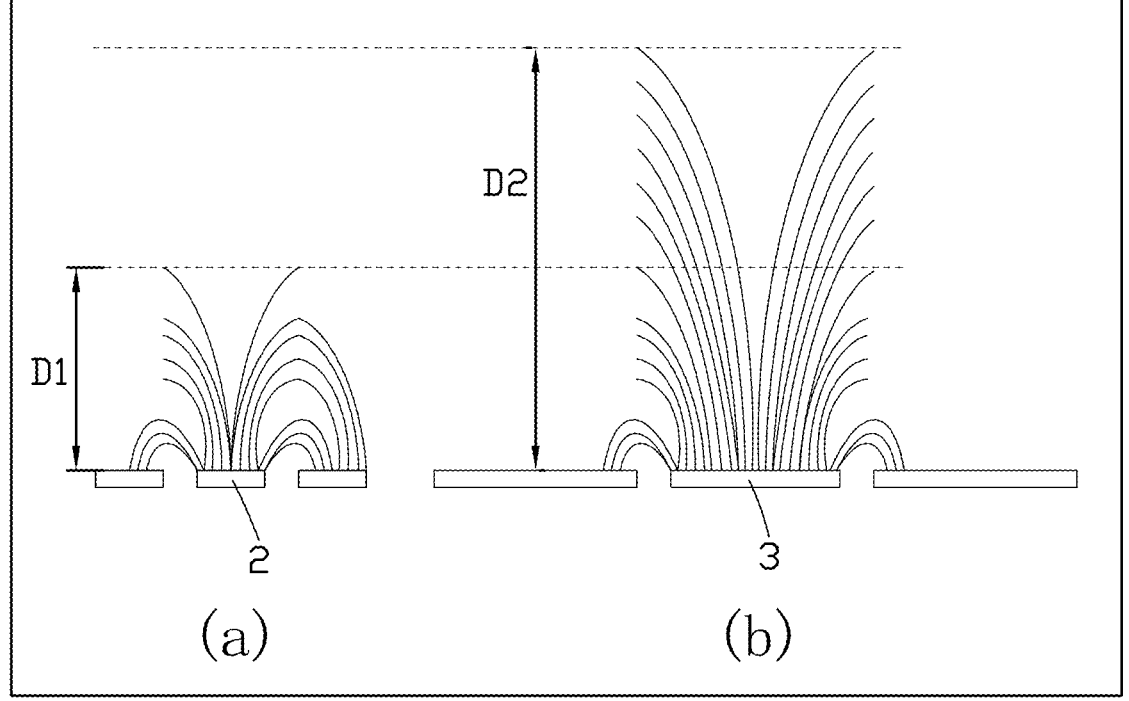
FIG. 4 is a schematic diagram of electric fields generated by touch electrodes at different touch distances.

The sensing distance of the touch device 10 is related to a size of the touch electrode 12. Referring to FIG. 4, part (a) shows an electric field generated by a single touch electrode 2, which gives a touch device including the touch electrode 2 a sensing distance D1. Part (b) shows an electric field generated when two adjacent touch electrodes 2 are electrically connected, and the two touch electrodes 2 electrically connected to each other are equivalent to one touch electrode 3, that is equivalent to doubling the area of a single touch electrode 2 in the touch device, wherein the electric field generated by the two electrically connected touch electrodes 2 (i.e. touch electrode 3) increases the sensing distance of the touch device to D2, and D2>D1. According to FIG. 4, a significant difference is between the sensing distance D2 and the sensing distance D1. Therefore, changing the electrical connection relationship between the touch electrodes can change the sensing distance of the touch device.

The touch device 10 of this embodiment includes the first switches 13, the second switches 14, and the switch control circuit 151, wherein the switch control circuit 151 is used to control the working states of the first switches 13 and the second switches 14 to adjust the electrical connection relationship between each two adjacent touch electrodes 12. In the touch device 10, the touch electrodes 12 that are electrically connected to each other are equivalent to one touch electrode. Therefore, adjusting the electrical connection relationship between each two touch electrode 12 is equivalent to adjusting the area of a single touch electrode in the touch device 10, which can achieve adjusting the sensing distance of the touch device 10. For example, reducing a number of touch electrodes 12 that are electrically connected to each other can reduce the sensing distance, and increasing a number of touch electrodes 12 that are electrically connected to each other can increase the sensing distance. Different sensing distances are needed for different touch scenarios. The sensing distance of the touch device 10 in this embodiment of the disclosure is adjustable and can be applied to various touch scenarios.

In the touch device 10 shown in FIG. 2, the first switches 13 are arranged in sequence along the first direction X, the second switches 14 are arranged in sequence along the second direction Y, and the first switches 13 and the second switches 14 are on the surface 111 of the substrate 11 independently of the touch IC 15.

Embodiment 2

Figure 3:
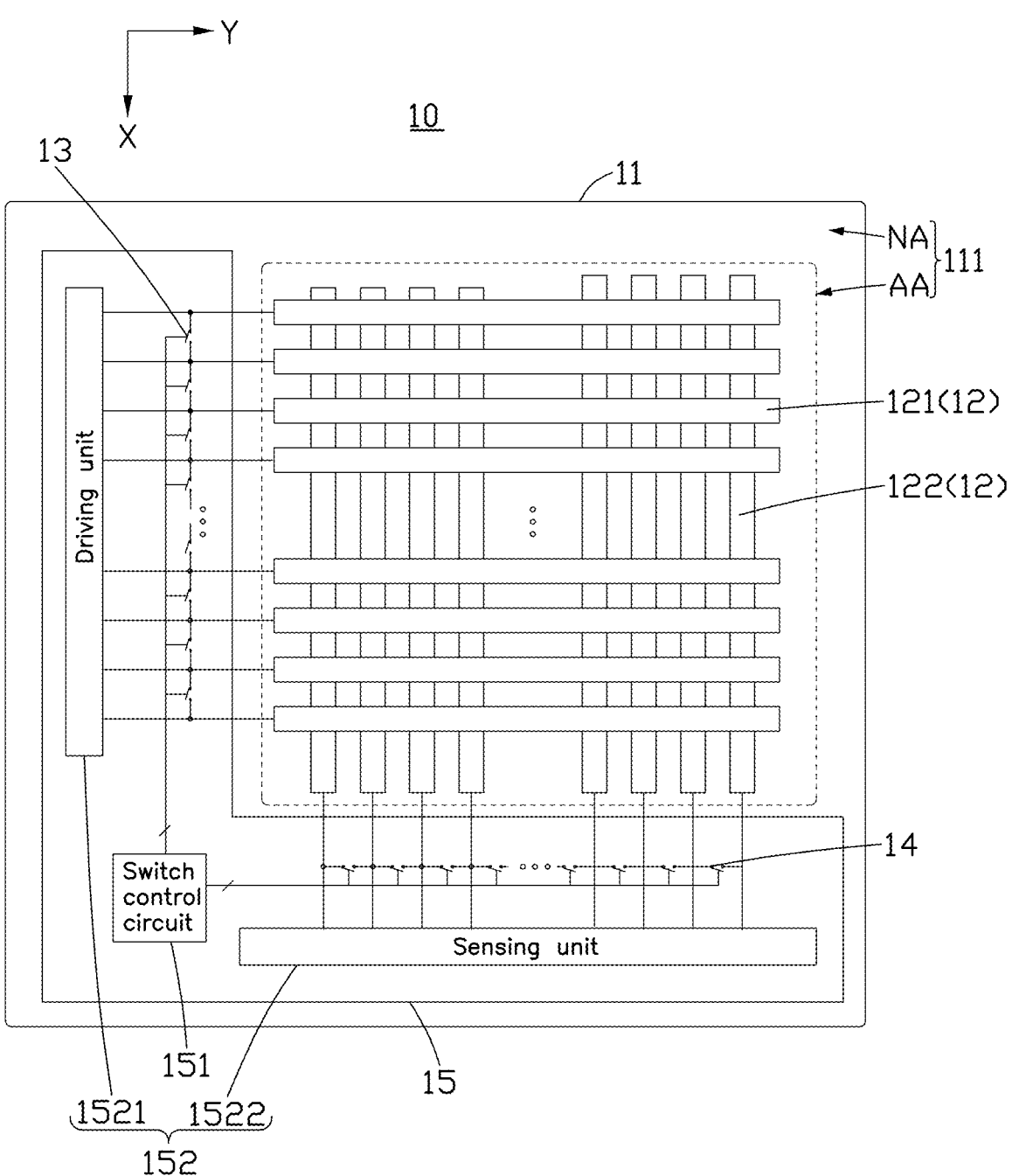
FIG. 3 is a s planar view of a second embodiment of a touch device of a smart apparatus according to the present disclosure.

Referring to FIG. 3, in a second embodiment of the present disclosure, the first switches 13 and the second switches 14 can be integrated into the touch IC 15. That is, the touch IC 15 includes the first switches 13, the second switches 14, the switch control circuit 151, and the touch control circuit 152. In other modified embodiments of the present application, the touch IC 15 may integrate the first switches 13 or the second switches 14.

The second embodiment can achieve all the beneficial effects of the first embodiment and a circuit layout in the non-display area NA can be further optimized.

Embodiment 3

Figure 5:
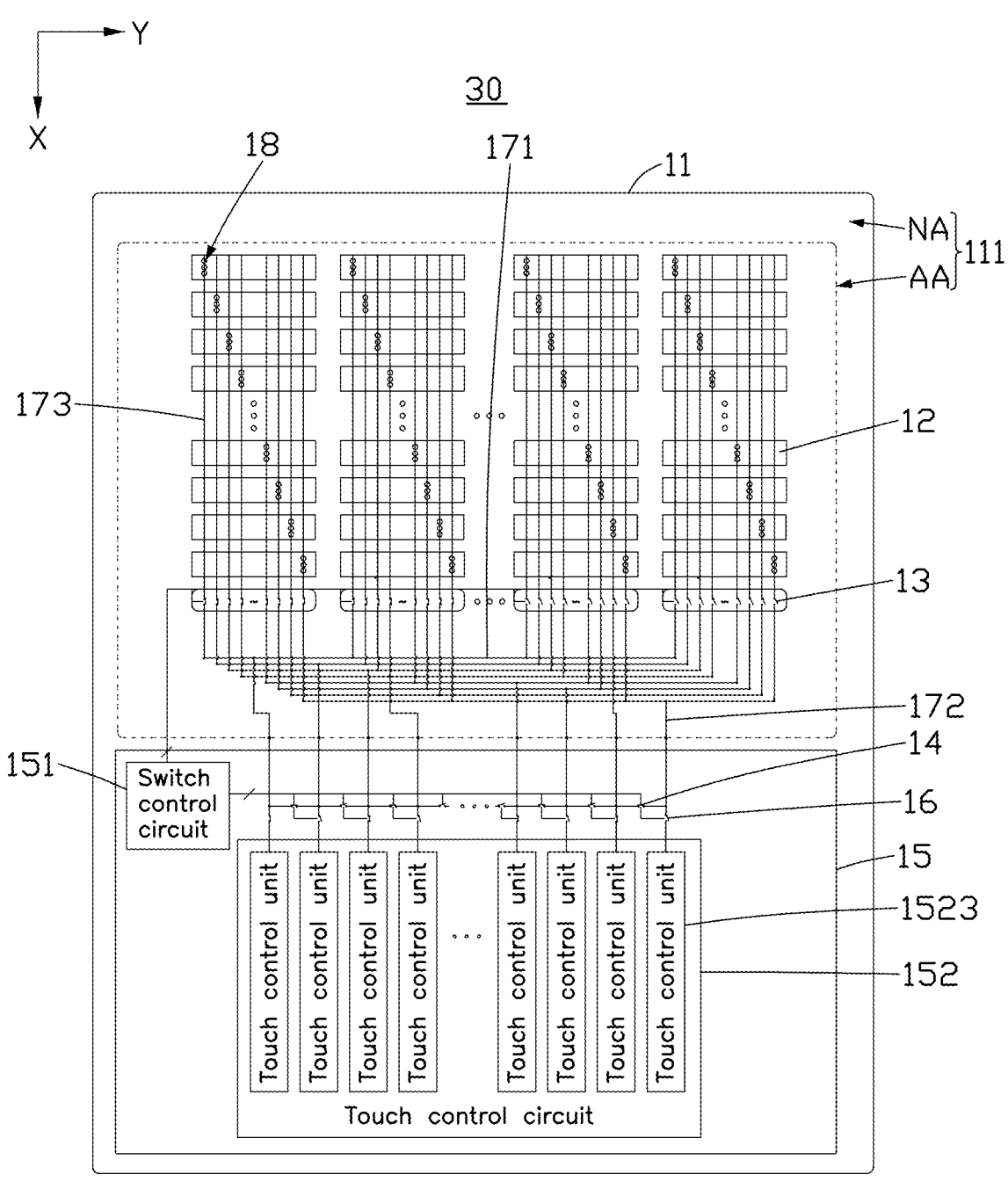
FIG. 5 is a planar view of a third embodiment of a touch device of a smart apparatus according to the present disclosure.

Referring to FIG. 5, in this embodiment, a main difference between the touch device 30 and the touch device 10 in the first embodiment is that the touch device 30 in this embodiment is an in-cell touch device.

In this embodiment, the touch electrode 12 are not divided into driving electrodes and sensing electrodes and have a same structure and function. All touch electrodes 12 are arranged in an array including a plurality of rows and a plurality of columns. Each row of the array includes a plurality of touch electrodes 12, and each column of the array includes plurality of touch electrodes 12. Each row includes a same number of touch electrodes 12 and each column includes a same number of touch electrodes 12. The touch electrodes 12 in a same row is arranged at along the second direction Y, and the touch electrodes 12 in a same column is arranged along the first direction X.

The touch device 30 includes the first switches 13, the second switches 14, and a plurality of third switches 16. Each first switch 13 is arranged in a row along the second direction Y, each second switch 14 is arranged in a row along the second direction Y, and each third switch 16 is arranged in a row along the second direction Y The first switches 13, the second switches 14, and the third switches 16 are in different rows.

Each first switch 13 is connected to one touch electrode 12.

The touch device 30 also includes a plurality of first wires 171. The first wires 171 are arranged along the first direction X, and each first wire 171 extends along the second direction Y Each first wire 171 is used to connect first switches 13 connected to touch electrodes 12 in a same row.

The touch device 30 also includes a plurality of second wires 172. Each second wire 172 is arranged along the second direction Y, and each second wire 172 extends along the first direction X. The first wires 171 and the second first switch 13 are connected one-to-one.

Each second switch 14 is connected to two adjacent second wires 172. Each third switch 16 is connected to one second wires 172 and the touch control circuit 152. In this embodiment, the touch control circuit 152 includes a plurality of touch control units 1523 connected in parallel. Each touch control unit 1523 is electrically connected to one second wire 172. The third switches 16 are used to control an electrical connection status between the second wires 172 and the touch control units 1523. In this embodiment, the touch control unit 1523 is a circuit for achieving corresponding function mentioned above and is a part of the touch IC 15.

In this embodiment, each first switch 13 and each second switch 14 is a MOS transistor. The switch control circuit 152 is connected to the gates of the first switches 13 and the second switches 14, respectively. The source and drain of each first switch 13 are connected to one first wire 171 and one second wire 172, respectively. The source and drain of each second switch 14 are connected to two adjacent second wires 172, respectively.

The working state of the first switches 13 and the second switches 14 are controlled as described in the first embodiment. The switch control circuit 151 can control the working states of the first switches 13 and the second switches 14 by controlling the amplitude of the first signals output to the first switches 13 and the amplitude of the second signals output to the second switches 14, thereby controlling the electrical connection relationship between each two adjacent touch electrodes 12 on the substrate 11.

In this embodiment, the touch device 10 also includes a plurality of third wires 173. the third wires 173 are arranged along the second direction Y, and each third wire 173 extends along the first direction X. Each third wire 173 is used to connect one first switch 13 and one touch electrode 12. At least partially of each third wire 173 is in the display area AA. In this embodiment, each touch electrode 12 is covered with a transparent insulation layer (not shown in the figure), and each third wire 173 is electrically connected to one touch electrode 12 through a through-hole 18 opened on the transparent insulation layer.

In this embodiment, all touch electrodes 12 are numbered, wherein touch electrodes 12 in the same row are numbered the same, and touch electrode 12 in the same column is numbered 1-50 in sequence along the first direction. FIG. 5 shows a structure that the touch electrodes 12 in a first and second columns of each row are electrically connected to each other.

In this embodiment, the touch control circuit 152 sends the driving signals and receives the sensing signals in a time-sharing manner. The touch control circuit 152 sends the driving signals to the touch electrodes 12 in a first period and receives the sensing signals from the touch electrodes 12 in a second period. The touch control circuit 152 is also used to recognize the user's touch operations based on the touch sensing signals.

Figure 6:
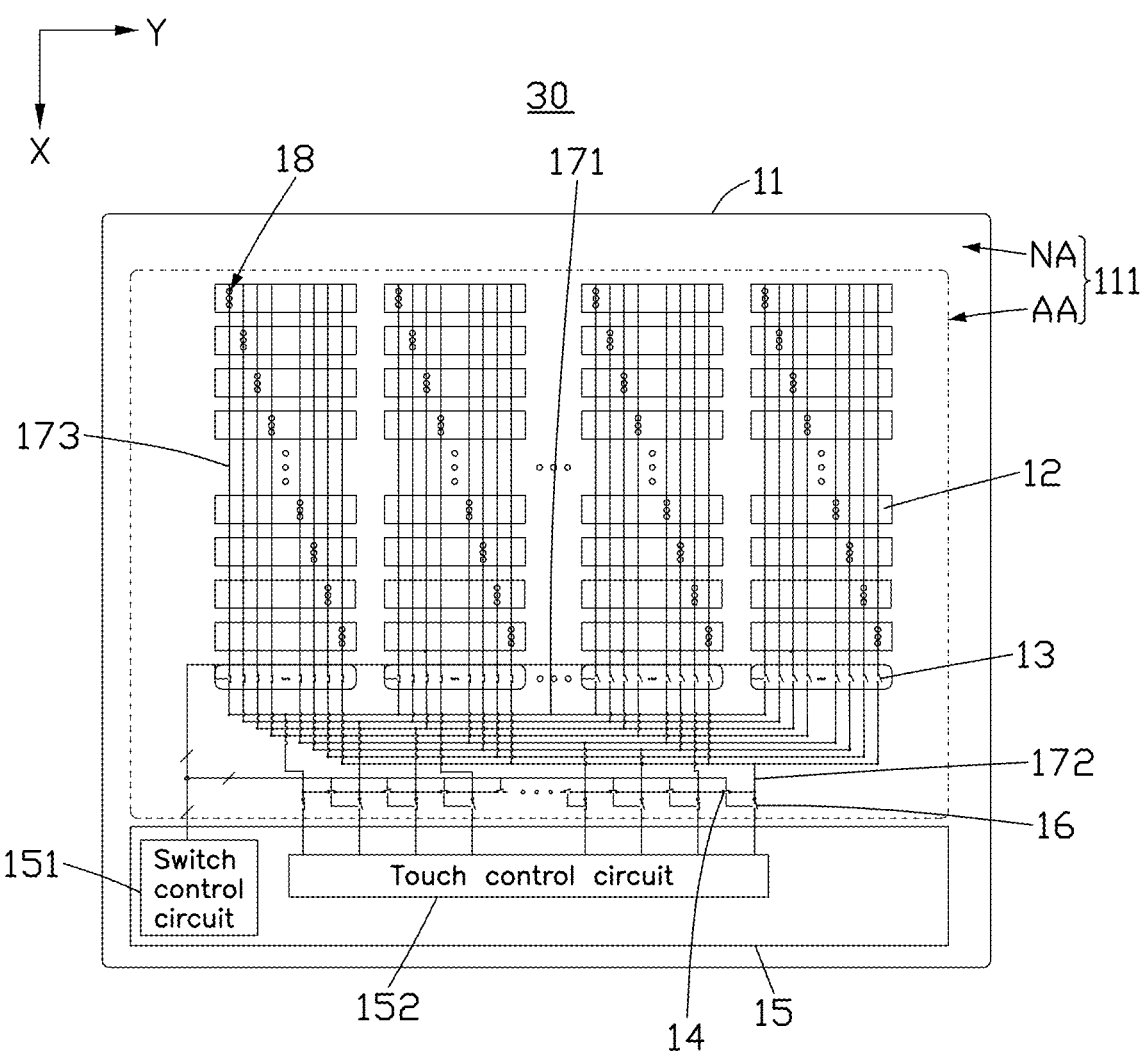
FIG. 6 is a s planar view of a fourth embodiment of a touch device of a smart apparatus according to the present disclosure.
Figure 7:
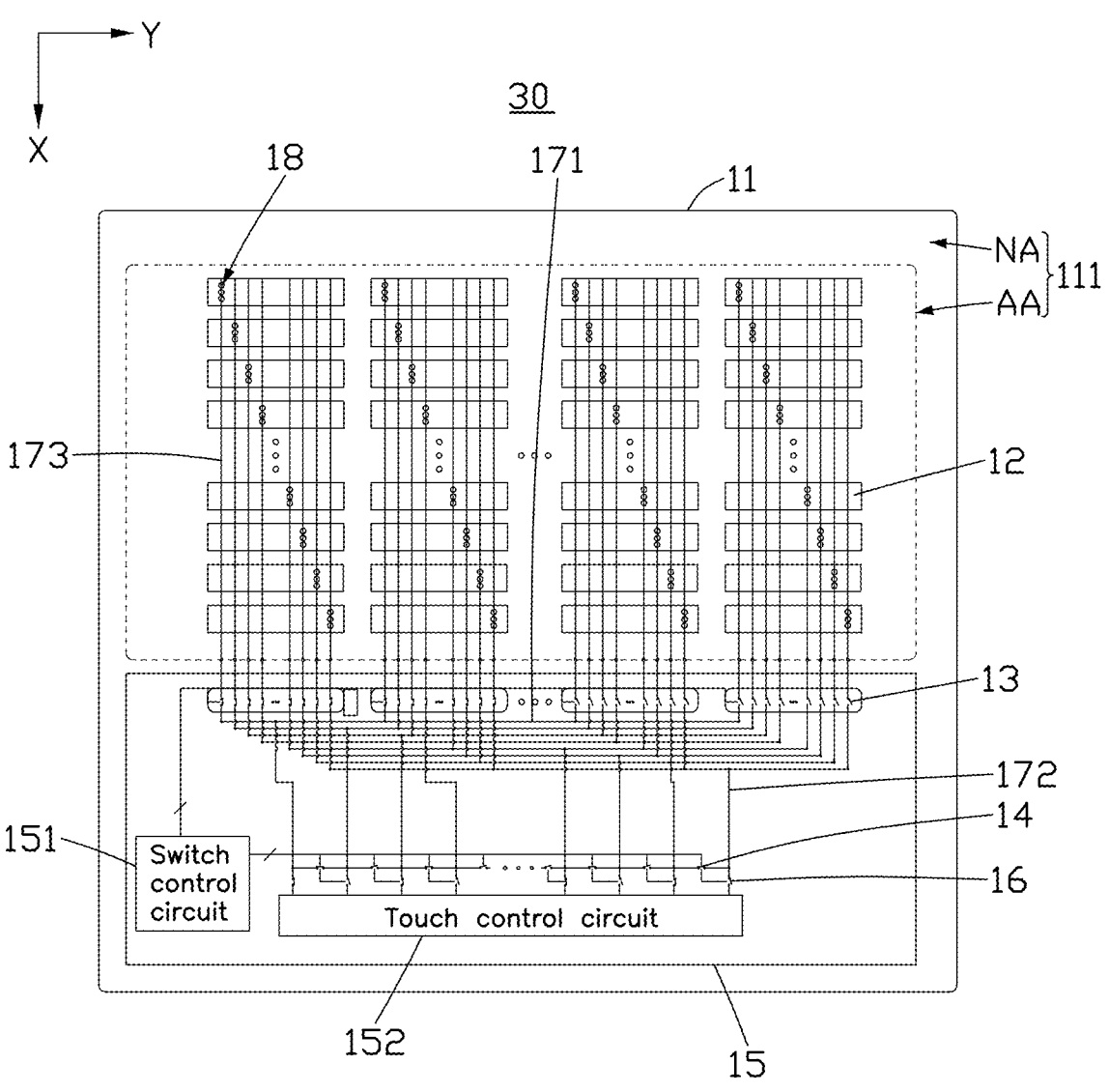
FIG. 7 is a s planar view of a fifth embodiment of a touch device of a smart apparatus according to the present disclosure.

In this embodiment, each first switch 13 is in the non-display area NA and is independent of the touch IC 15, and each second switch 14 is integrated into the touch IC 15. Referring to FIG. 6, in a fourth embodiment of the present disclosure, the second switches 14 are also independent of the touch IC 15. Referring to FIG. 7, in a fifth embodiment of the present disclosure, the first switches 13 and the second switches 14 are integrated into the touch IC 15.

The second embodiment of the present disclosure and the above-mentioned modified embodiments can achieve all the beneficial effects of the first embodiment, and the circuit layout in the non-display area NA can be further optimized.

Figure 8:
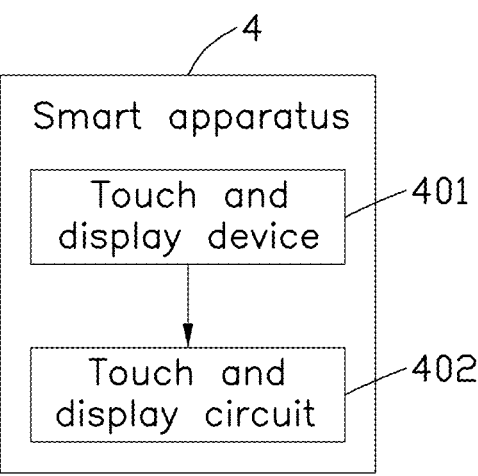
FIG. 8 is a schematic diagram of a sixth embodiment of a smart apparatus according to the present disclosure.

Referring to FIG. 8, in a sixth embodiment of the present disclosure, a smart apparatus 4 does not include separate touch device and display module, but includes an integrated touch and display device 401. That is, in this modified embodiment, the touch and display device 401 includes all the structures of the touch device 10 and can achieve all the functions of the touch device 10. The touch and display device 401 further includes other components that can achieve display functions. Moreover, in this modified embodiment, the smart apparatus 4 includes an integrated touch and display circuit 402 instead of including separate touch IC and display driver IC. The touch and display circuit 402 is electrically connected to the touch and display device 401 and is used to drive the touch and display device 401 to recognize touch operations and display images based on the touch operations.

The smart apparatus 1 in the above modified embodiment can achieve all the beneficial effects of the first embodiment and the second embodiment.

Finally, it should be noted that the above embodiments are only used to illustrate the technical solution of the present application and not to limit the present application. Although the present application has been described in detail with reference to preferred embodiments, one ordinary skill in the art should understand that the technical solution of the present application can be modified or equivalent replaced without departing from the spirit and scope of the technical solution of the present application.

What is claimed is:

1. A touch device comprising:
   a substrate;
   a plurality of touch electrodes on a surface of the substrate;
   a plurality of first switches and a plurality of second switches on the surface of the substrate, each of the plurality of first switches being connected to at least one of the plurality of touch electrodes, the plurality of first switches being connected to different touch electrodes;
   a switch control circuit on the surface of the substrate and connected to the plurality of first switches and the plurality of the second switches, the switch control circuit being configured to output a first signal to each of the plurality of first switches, output a second signal to each of the plurality of second switches, and control working states of the plurality of first switches and the plurality of second switches according to the first signal and the second signal, respectively, to control connection relationships of the plurality of touch electrodes; and
   a touch control circuit on the surface of the substrate and connected to the plurality of touch electrodes, the touch control circuit being configured to recognize touch operations on at least parts of the plurality of touch electrodes,
   wherein the plurality of touch electrodes is spaced apart from each other and arranged in an array comprising a plurality of rows and a plurality of columns on the surface of the substrate; each of the plurality of first switches is connected to a corresponding touch electrode of the plurality of touch electrodes; the touch device further comprises a plurality of first wires and a plurality of second wires connected one-to-one, each of the plurality of first wires is connected to the first switches connecting the touch electrodes in a same row of the plurality of rows, each of the plurality of second wires is connected to the touch control circuit, and each of the plurality of second switches is connected to two adjacent second wires of the plurality of second wires.

2. The touch device according to claim 1, wherein each of the plurality of first switches is connected to two adjacent touch electrodes of the plurality of touch electrodes.

3. The touch device according to claim 1, further comprising a touch integrated circuit on the surface of the substrate, wherein the touch IC comprises the switch control circuit and the touch control circuit.

4. The touch device according to claim 3, wherein the touch IC further comprises the plurality of first switches and/or the plurality of second switches.

5. The touch device according to claim 1, wherein the switch control circuit outputs the first signal and the second signal in voltage signals, each of the plurality of first switches is connected with two adjacent touch electrodes of the plurality of touch electrodes;

each of the plurality of first switches is switched on when the plurality of first switches receives the first signal having a voltage greater than or equal to a first gate voltage, thereby causes the two adjacent touch electrodes electrically connected to each other; each of the plurality of first switches is switched off when the voltage of the first signal is less than the first gate voltage, thereby causes the two adjacent touch electrodes insulated to each other; and each of the plurality of second switches is switched on when the plurality of second switches receives the second signal having a voltage greater than or equal to a second gate voltage, thereby causes the two adjacent touch electrodes electrically connected to each other; each of the plurality of second switches is switched off when the voltage of the second signal is less than the second gate voltage, thereby causes the two adjacent touch electrodes insulated to each other.

6. The touch device according to claim 5, wherein each of the plurality of first switches is a transistor, and each of the plurality of second switches is a transistor.

7. The touch device according to claim 1, wherein the touch control circuit is further configured to recognize non-contact touch operations on at least part of the plurality of touch electrodes.

8. A smart apparatus comprising:
a touch device comprising:
a substrate;
a plurality of touch electrodes on a surface of the substrate;
a plurality of first switches and a plurality of second switches on the surface of the substrate, each of the plurality of first switches being connected to at least one of the plurality of touch electrodes, the plurality of first switches being connected to different touch electrodes;
a switch control circuit on the surface of the substrate and connected to the plurality of first switches and the plurality of the second switches, the switch control circuit being configured to output a first signal to each of the plurality of first switches, output a second signal to each of the plurality of second switches, and control working states of the plurality of first switches and the plurality of second switches according to the first signal and the second signal, respectively, to control connection relationships of the plurality of touch electrodes; and a touch control circuit on the surface of the substrate and connected to the plurality of touch electrodes, the touch control circuit being configured to recognize touch operations on at least parts of the plurality of touch electrodes; and a display module electrically connected to the touch device, and being configured to display images based on the touch operations, wherein the plurality of touch electrodes is spaced apart from each other and arranged in an array comprising a plurality of rows and a plurality of columns on the surface of the substrate; each of the plurality of first switches is connected to a corresponding touch electrode of the plurality of touch electrodes; the touch device further comprises a plurality of first wires and a plurality of second wires connected one-to-one, each of the plurality of first wires is connected to the first switches connecting the touch electrodes in a same row of the plurality of rows, each of the plurality of second wires is connected to the touch control circuit, and each of the plurality of second switches is connected to two adjacent second wires of the plurality of second wires.

9. The smart apparatus according to claim 8, wherein each of the plurality of first switches is connected to two adjacent touch electrodes of the plurality of touch electrodes.

10. The smart apparatus according to claim 8, further comprising a touch integrated circuit on the surface of the substrate, wherein the touch IC comprises the switch control circuit and the touch control circuit.

11. The smart apparatus according to claim 10, wherein the touch IC further comprises the plurality of first switches and/or the plurality of second switches.

12. The smart apparatus according to claim 8,
wherein the switch control circuit outputs the first signal and the second signal in voltage signals, each of the plurality of first switches is connected with two adjacent touch electrodes of the plurality of touch electrodes;

each of the plurality of first switches is switched on when the plurality of first switches receives the first signal having a voltage greater than or equal to a first gate voltage, thereby causes the two adjacent touch electrodes electrically connected to each other; each of the plurality of first switches is switched off when the voltage of the first signal is less than the first gate voltage, thereby causes the two adjacent touch electrodes insulated to each other; and each of the plurality of second switches is switched on when the plurality of second switches receives the second signal having a voltage greater than or equal to a second gate voltage, thereby causes the two adjacent touch electrodes electrically connected to each other; each of the plurality of second switches is switched off when the voltage of the second signal is less than the second gate voltage, thereby causes the two adjacent touch electrodes insulated to each other.

13. The smart apparatus according to claim 12, wherein each of the plurality of first switches is a transistor, and each of the plurality of second switches is a transistor.

14. The smart apparatus according to claim 8, wherein the touch control circuit is further configured to recognize non-contact touch operations on at least part of the plurality of touch electrodes.

15. A smart apparatus comprising an integrated touch and display device configured to display images based on touch operations, the touch and display device comprising:

a substrate;

a plurality of touch electrodes on a surface of the substrate;

a plurality of first switches and a plurality of second switches on the surface of the substrate, each of the plurality of first switches being connected to at least one of the plurality of touch electrodes, the plurality of first switches being connected to different touch electrodes;

a switch control circuit on the surface of the substrate and connected to the plurality of first switches and the plurality of the second switches, the switch control circuit being configured to output a first signal to each of the plurality of first switches, output a second signal to each of the plurality of second switches, and control working states of the plurality of first switches and the plurality of second switches according to the first signal and the second signal, respectively, to control connection relationships of the plurality of touch electrodes; and a touch control circuit on the surface of the substrate and connected to the plurality of touch electrodes, the touch control circuit being configured to recognize touch operations on at least parts of the plurality of touch electrodes, wherein the plurality of touch electrodes is spaced apart from each other and arranged in an array comprising a plurality of rows and a plurality of columns on the surface of the substrate; each of the plurality of first switches is connected to a corresponding touch electrode of the plurality of touch electrodes; the touch device further comprises a plurality of first wires and a plurality of second wires connected one-to-one, each of the plurality of first wires is connected to the first switches connecting the touch electrodes in a same row of the plurality of rows, each of the plurality of second wires is connected to the touch control circuit, and each of the plurality of second switches is connected to two adjacent second wires of the plurality of second wires.

* * * * *